United States Patent
Kobayashi

(10) Patent No.: US 10,466,574 B2
(45) Date of Patent: Nov. 5, 2019

(54) IMAGE PROJECTION APPARATUS

(71) Applicant: CANON KABUSHIKI KAISHA, Tokyo (JP)

(72) Inventor: Keisuke Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/037,316

(22) Filed: Jul. 17, 2018

(65) Prior Publication Data

US 2019/0025677 A1 Jan. 24, 2019

(30) Foreign Application Priority Data

Jul. 21, 2017 (JP) ................. 2017-141436

(51) Int. Cl.
| | | |
|---|---|---|
| G03B 21/00 | (2006.01) | |
| G03B 21/14 | (2006.01) | |
| G03B 21/28 | (2006.01) | |
| H04N 9/31 | (2006.01) | |
| G02B 27/09 | (2006.01) | |
| H04N 5/74 | (2006.01) | |

(52) U.S. Cl.
CPC ....... *G03B 21/006* (2013.01); *G02B 27/0955* (2013.01); *G03B 21/142* (2013.01); *G03B 21/145* (2013.01); *G03B 21/28* (2013.01); *H04N 5/7408* (2013.01); *H04N 5/7416* (2013.01); *H04N 9/31* (2013.01); *H04N 9/3185* (2013.01); *H04N 9/3194* (2013.01); *G03B 2206/00* (2013.01)

(58) Field of Classification Search
CPC .... G03B 21/006; G03B 21/28; G03B 21/142; G03B 21/147; G03B 21/208; H04N 9/317; H04N 9/3108; H04N 9/3185
See application file for complete search history.

(56) References Cited

U.S. PATENT DOCUMENTS

| | | | | |
|---|---|---|---|---|
| 2010/0195063 | A1* | 8/2010 | Fujimaki | G03B 21/142 353/101 |
| 2011/0216290 | A1 | 9/2011 | Maruyama | |
| 2011/0292351 | A1* | 12/2011 | Ishii | H04N 9/3185 353/69 |
| 2012/0218527 | A1* | 8/2012 | Hatakeyama | G03B 21/142 353/101 |

(Continued)

FOREIGN PATENT DOCUMENTS

| | | |
|---|---|---|
| JP | H06130353 A | 5/1994 |
| JP | 2000081601 A | 3/2000 |

(Continued)

OTHER PUBLICATIONS

Office Action issued in Japanese Appln. No. 2017-141436 dated Jul. 3, 2018. English translation provided.

(Continued)

*Primary Examiner* — Sultan Chowdhury
(74) *Attorney, Agent, or Firm* — Rossi, Kimms & McDowell LLP

(57) ABSTRACT

An image projection apparatus includes an acquirer configured to acquire information on a lens unit, and a controller configured to set, based on the information on the lens unit, at least one of an image orientation of a projection image and a shift direction of the lens unit.

17 Claims, 4 Drawing Sheets

(56) References Cited

U.S. PATENT DOCUMENTS

| | | | | |
|---|---|---|---|---|
| 2012/0327372 A1* | 12/2012 | Otani | ............... | G02B 13/08 353/31 |
| 2013/0286361 A1* | 10/2013 | Vasquez | ............ | G03B 21/28 353/70 |
| 2015/0022789 A1 | 1/2015 | Sato | | |
| 2015/0070662 A1* | 3/2015 | Nishima | ............ | H04N 9/3188 353/70 |
| 2017/0168377 A1* | 6/2017 | Fujii | ............... | G03B 29/00 |

FOREIGN PATENT DOCUMENTS

| | | | |
|---|---|---|---|
| JP | 2003295310 A | 10/2003 |
| JP | 2008083428 A | 4/2008 |
| JP | 2010181594 A | 8/2010 |
| JP | 2011180407 A | 9/2011 |
| JP | 2011193337 A | 9/2011 |
| JP | 2011252938 A | 12/2011 |
| JP | 2012173699 A | 9/2012 |
| JP | 2014130182 A | 7/2014 |
| JP | 2014137450 A | 7/2014 |
| JP | 2015022099 A | 2/2015 |
| JP | 2015102783 A | 6/2015 |
| JP | 2015145895 A | 8/2015 |
| JP | 2015152747 A | 8/2015 |
| JP | 2016045259 A | 4/2016 |
| JP | 2016180859 A | 10/2016 |

OTHER PUBLICATIONS

Extended European Search Report issued in European Appln. No. 18183971.3 dated Nov. 20, 2018.

Office Action issued in Japanese Appl. No. 2018-211948 dated Aug. 27, 2019. English translation provided.

* cited by examiner

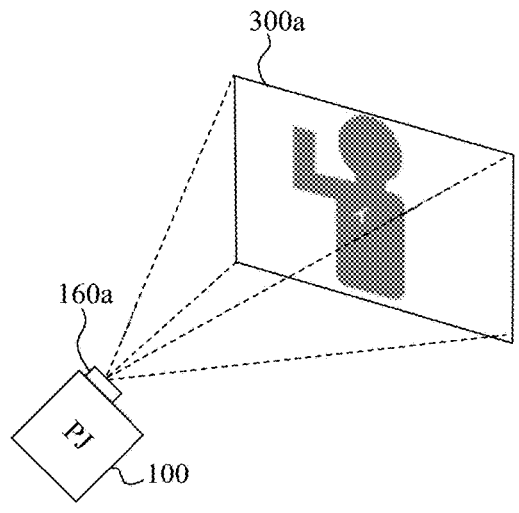
FIG. 1A
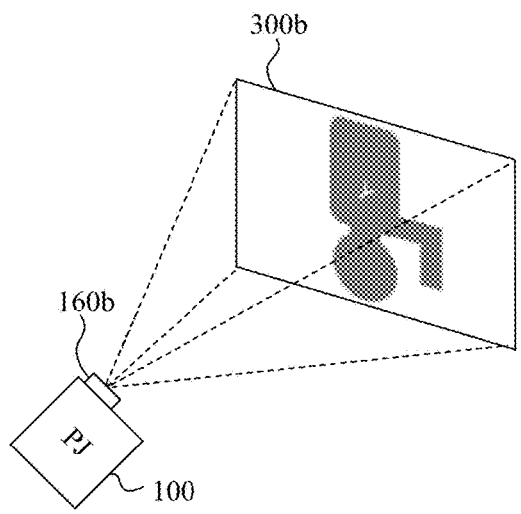
FIG. 1B
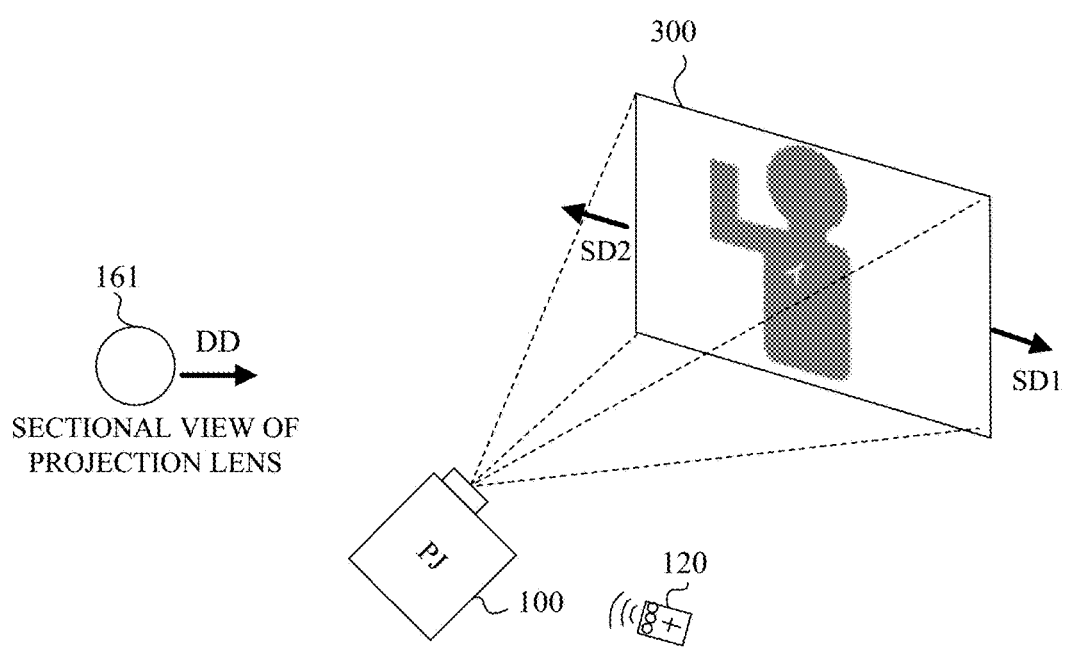
FIG. 2A
FIG. 2B

IMAGE PROJECTION APPARATUS

BACKGROUND OF THE INVENTION

Field of the Invention

The present invention relates to an image projection apparatus that projects an image.

Description of the Related Art

A projection image projected by an image projection apparatus, such as a projector, may be reversed or rotated when it is viewed by a viewer depending on a projection method (such as a landscape orientation (floor installation), a portrait orientation (vertical installation), a ceiling-hung installation, and a rear projection). Thus, one known image projection apparatus serves to reverse or rotate the projection image. Another known image projection apparatus has a lens shift function that optically shifts the projection image by shifting the projection lens from the optical axis.

Japanese Patent Laid-Open No. ("JP") 2003-295310 discloses an image projection apparatus that includes a sensor that detects an installation state of the image projection apparatus, and automatically reverses the projection image in accordance with the installation state.

In another known image projection apparatus, the projection lens unit is interchangeable for changing an angle of view of a projection image, an optical performance, etc. An image orientation of the projection image and a shift direction of the projection image when the projection lens is shifted depend on a design of the projection optical system. Therefore, when the projection optical system changes as the projection lens unit is interchanged or the like, the image orientation and the shift direction of the projection image may be different from the expectation of the user.

The image projection apparatus disclosed in JP 2003-295310 cannot automatically change the setting when the projection optical system is changed. It is thus necessary for the user to change the setting of the image projection apparatus whenever the projection optical system is changed and the image orientation and shift direction of the projection image are changed.

However, it is arduous for the user to change the setting whenever the projection lens unit is interchanged, to open the menu, and to change the setting when the projection image is reversed. When the shift direction of the projection image is reversed, the expectation of the user may not accord with the shift direction.

SUMMARY OF THE INVENTION

The present invention provides an image projection apparatus that can automatically change the setting when a projection optical system is interchanged.

An image projection apparatus according to one aspect of the present invention includes an acquirer configured to acquire information on a lens unit, and a controller configured to set, based on the information on the lens unit, at least one of an image orientation of a projection image and a shift direction of the lens unit.

Further features of the present invention will become apparent from the following description of exemplary embodiments with reference to the attached drawings.

BRIEF DESCRIPTION OF THE DRAWINGS

FIGS. 1A and 1B are explanatory views of an image orientation of a projection image according to this embodiment.

FIGS. 2A and 2B are explanatory views of a shift direction of the projection image according to this embodiment.

DESCRIPTION OF THE EMBODIMENTS

Figure 3:
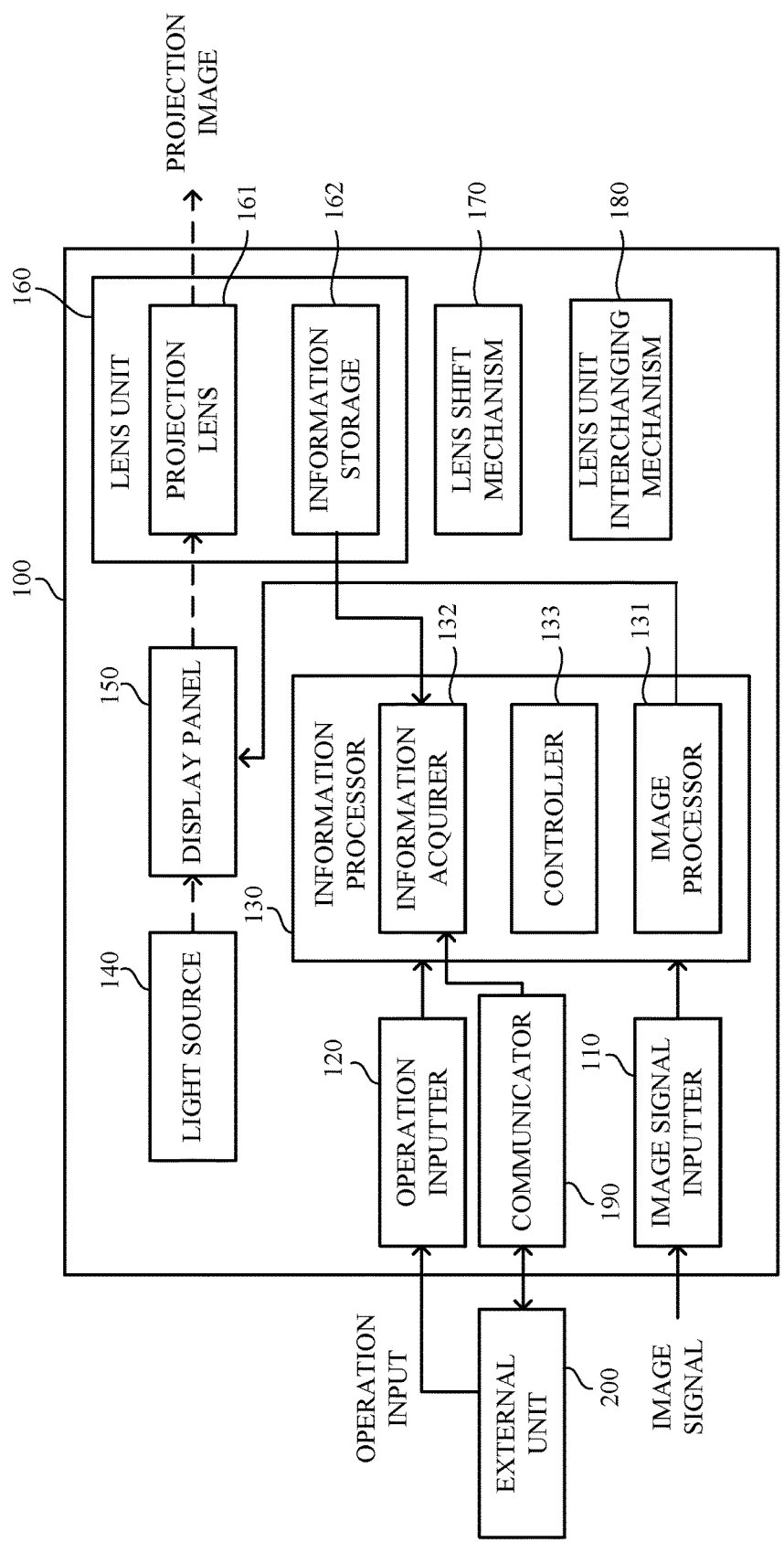
FIG. 3 is a block diagram of an image projection apparatus according to this embodiment.

Referring now to the accompanying drawings, a detailed description will be given of an embodiment of the present invention.

(Description of Overall System)

A description will now be given of a liquid crystal projector as an image projection apparatus according to this embodiment, in which a projection lens unit is interchangeable. FIGS. 1A and 1B are explanatory views of a projection image of a projector (image projection apparatus) 100 according to this embodiment. FIG. 1A illustrates a projection image when a lens unit 160a is attached, and FIG. 1B illustrates a projection image when the lens unit 160b is attached.

As illustrated in FIG. 1A, the projector 100 projects an image via a (projection) lens unit 160a, and displays a projection image 300a on a target plane, such as a screen. The projector 100 has a lens shift function that can shift the projection image 300a by shifting a projection lens (projection optical system) 161 relative to the optical axis (or by moving the projection lens 161 in a direction orthogonal to the optical axis). The lens unit 160a is interchangeably attached to the projector 100. Thus, the projector 100 can change an optical characteristic, such as an angle of view and a resolution performance of the projection image, by interchanging lens units having different projection optical systems.

When the lens unit 160 is interchanged, the image orientation of the projection image (vertical or lateral direction of the projection image) and the shift direction of the projection image relative to the shift direction of the projected lens 161 change due to the design of the projection optical system. When the lens unit 160a is interchanged with the lens unit 160b, as illustrated in FIG. 1B, the projector 100 displays the projection image 300b. The lens unit 160b includes an optical system in which the projection image is reversed (rotated) in each of the vertical and lateral directions in comparison with the lens unit 160a. Hence, when the lens unit 160a is interchanged with the lens unit 160b, the projection image 300b in which the projection image 300a is reversed is displayed.

In the lens unit 160b, the shift direction of the projection image is reversed relative to the shift direction of the projected lens 161. FIGS. 2A and 2B are explanatory views of the shift direction of a projection image 300. FIG. 2A is a simplified sectional view of the projection lens 161 viewed from an opposite direction of the projection image 300. FIG. 2B illustrates the shift direction of the projection image 300. Assume that a right direction is input to the projector 100 through a remote controller as an operation inputter 120 and the projection lens 161 is shifted in the right direction illustrated by an arrow DD in FIG. 2A. At this time, the projection image 300 illustrated in FIG. 2B is shifted in an arrow SD1 direction in FIG. 2B when the lens unit 160a is attached. On the other hand, when the lens unit 160b is attached, the projection image 300 is shifted in an arrow SD2 direction in FIG. 2B, which is a direction different from (opposite to) the expectation of the user.

Each of the lens units 160*a* and 160*b* has a nonvolatile memory (information memory or storage 162). A CPU (controller 133) in the projector 100 can read information stored in the nonvolatile memory. The nonvolatile memory stores information of each lens unit. The projector 100 sets an operational parameter (at least one of the image orientation of the projection image or the shift direction of the projection image) of the projector 100 according to the information of the lens unit. The projector 100 changes the image orientation of the projection image 300 or the shift direction of the lens unit 160 in accordance with the set operational parameter (at least one of the image orientation and the shift direction of the projection image). Thereby, even when the lens unit 160 is interchanged from the lens unit 160*a* to the lens unit 160*b* so as to change the projection optical system (projection lens 161), at least one of the image orientation and the shift direction of the projection image 300 can be maintained. As a result, the setting of the projector 100 is changed without causing the user to recognize the change of the projection optical system. Due to this configuration, the projector 100 can automatically change the setting as expected by the user when the projection optical system is changed due to the interchange of the lens unit etc.

(Description of the Functional Block)

Referring now to FIG. 3, a description will be given of the function of the projector 100. FIG. 3 is a block diagram of the projector 100. An image signal inputter 110 includes a composite terminal, a terminal unit for inputting an image signal, such as a DVI terminal and a HDMI terminal, a receiver for receiving an image signal through a radio communication, and a receiver IC for receiving an input image signal input from the above terminal. The image signal inputter 110 outputs an image signal input from an external unit 200, such as a personal computer, to an information processor 130.

The operation inputter 120 is an operating unit to which the user inputs an operational instruction into the projector 100. The operation inputter 120 includes a button used for a user to input an operation, or a remote controller used to remotely control the projector 100 and an infrared light receiver for receiving the infrared ray from the remote controller, etc., and converts the input operation into a signal. An operation type is, but not limited to, power on/off, vertical and horizontal movements, entering, cancelling, a menu display, etc.

The information processor 130 includes a microcomputer etc. which has an image processor 131, an information acquirer 132, a controller 133, a CPU, a RAM, and a ROM, and can execute a programmed process. The controller 133 serves to set the operational parameter of the projector 100 (at least one of the image orientation of the projection image and the shift direction of the projection image), and to detect the information of the lens unit 160.

The image processor 131 generates an image signal by performing image processing for an image signal input from the image signal inputter 110, such as a brightness correction, a contrast correction, a gamma correction, a color conversion, a resolution conversion, and sharpness processing. The image processor 131 outputs the generated image signal to the display panel 150. The image processor 131 serves as an image orientation changer for reversing and rotating the input image. The information acquirer 132 is an acquirer for acquiring information on the lens unit 160. The information acquirer 132 reads the nonvolatile memory as the information storage 162 through the microcomputer, and acquires information on the lens unit 160. The controller 133 is connected to each component in the projector 100, such as a lens shift mechanism 170 and a light source 140, and controls an overall operation of the projector 100 in accordance with the set operational parameter.

The light source 140 includes a lamp, a laser diode, an LED, etc., and generates light used to project an image. The display panel 150 includes a light modulation element, such as a LCD (Liquid Crystal Display), a LCOS (Liquid Crystal on Silicon), and a DMD (Digital Mirror Device). The display panel 150 modulates light by reflecting or transmitting light emitted from the light source 140 based on the image signal output from the image processor 131.

The lens unit 160 includes the projection lens 161 and the information storage 162. The projection lens 161 forms an image of light modulated by the display panel 150 on the target plane, such as a screen. Thereby, the image is displayed on the target plane. The thus configured lens unit 160 has a variety of functions. For example, the lens unit 160 has, for example, a zooming function for changing the size of the projection image by driving the projection lens 161, a focusing function for curving a focal length and area, and a function for changing an image projecting direction using a mirror (mirror mounted lens).

Figure 4:
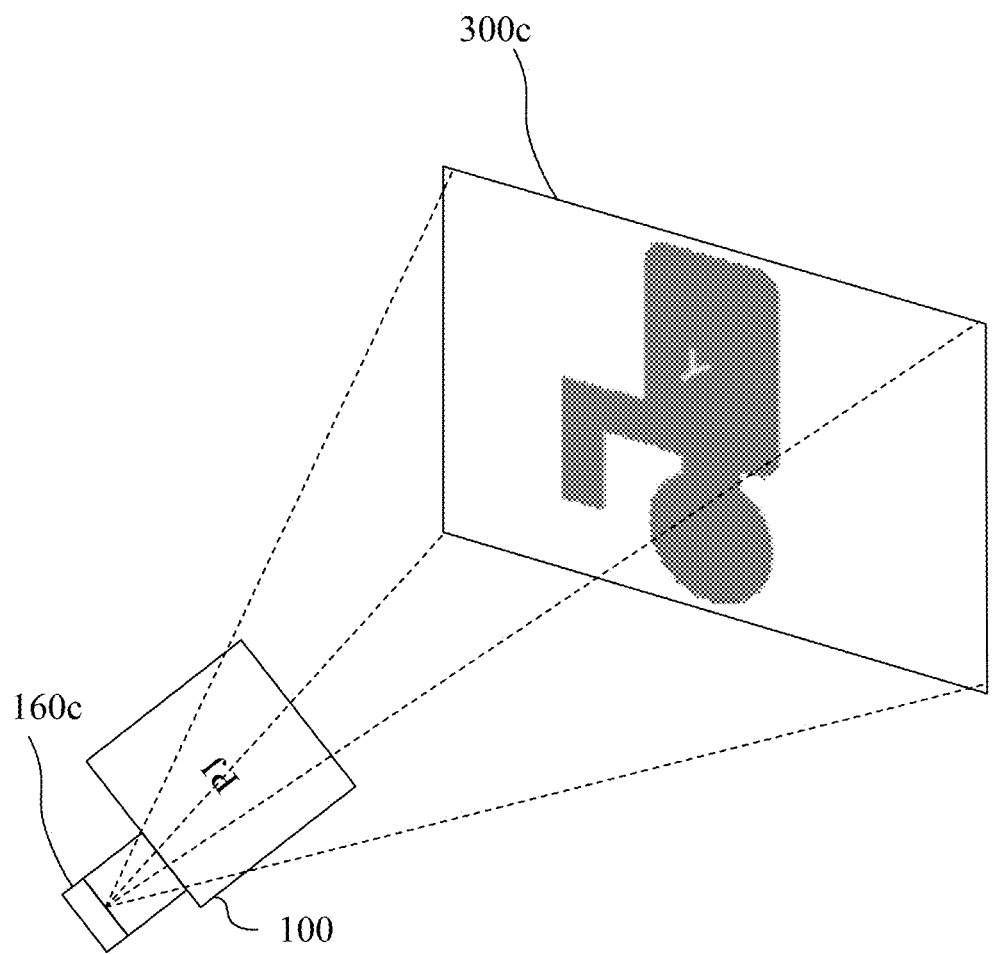
FIG. 4 is an explanatory view of a projection image when a mirror mounted lens unit according to this embodiment is attached.

FIG. 4 is an explanatory view of a projection image when a lens unit 160*c* as a mirror mounted lens is attached to the projector 100. The mirror mounted lens illustrated in FIG. 4 displays a projection image 300*c* at the back of the projector 100 by reflecting the projected light through the mirror where a mount surface side of the lens unit 160*c* is defined as the front of the projector 100. The mirror may be movable, and then the controller 133 sets at least one of the image orientation of the projection image and the shift direction of the projection image in accordance with the mirror state.

The information storage 162 is a nonvolatile memory, such as an EEPROM and a flash memory, and stores the information on the lens unit 160. The CPU (controller 133) can read the information on the lens unit 160 by sending and receiving an electric signal to and from the information storage 162. The information storage 162 is installed in the lens unit 160 and can read information corresponding to the changed lens unit 160 even when the lens unit 160 is changed.

A lens shift mechanism 170 is a mechanism for shifting the projection lens 161 relative to the optical axis, and optically shifts the projection image by shifting the projection lens 161. A lens unit interchanging mechanism 180 includes a mount mechanism (a mount unit that interchangeably attaches the lens unit 160) that detaches the lens unit attached to the projector 100, and attaches another lens unit having a different configuration such as an optical design. Due to this structure, the projector 100 can be used with the interchanged lens unit 160.

(Detailed Description of Processing)

Figure 5:
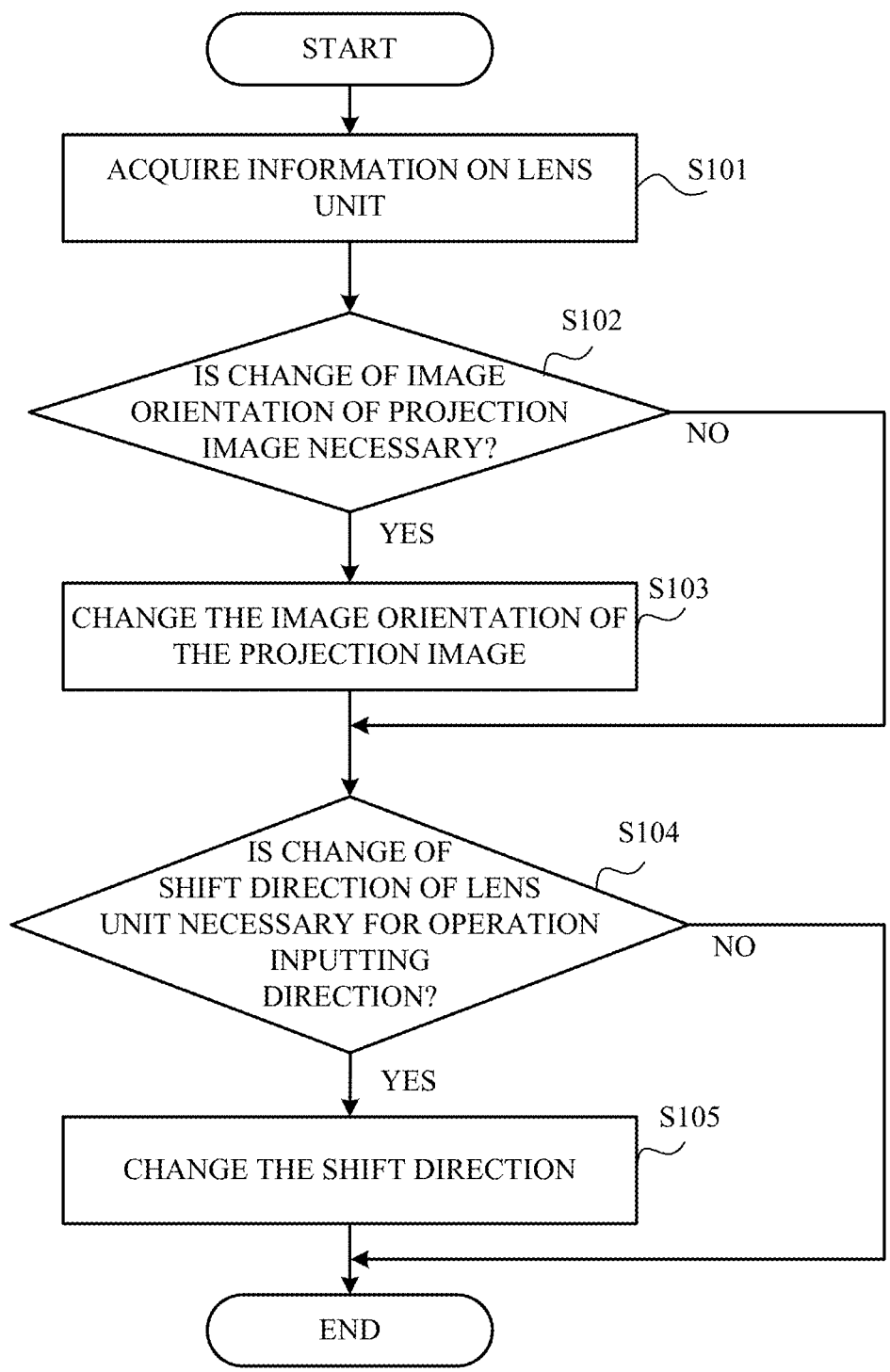
FIG. 5 is a flowchart of an operation of an image projection apparatus according to this embodiment.

Referring now to FIG. 5, a description will be given of a setting change after the projection lens is interchanged. FIG. 5 is a flowchart of the setting change after the projection lens is interchanged. Each step in FIG. 5 is executed mainly by the controller 133.

Initially, in the step S101, the information acquirer 132 in the projector 100 reads information on the lens unit 160, out of the nonvolatile memory as the information storage 162 in the lens unit 160. This embodiment directly electrically connects the memory such as the EEPROM as the information storage 162 to the information processor 130 in the projector 100, and reads out the information on the lens unit 160. Alternatively, the lens unit 160 may include the microcomputer and the information acquirer 132 may acquire the information through communications with the microcomputer. The information acquirer 132 can detect a change of the information on the lens unit 160 by reading the information on the lens unit 160 on continuously or regularly. The information acquirer 132 may acquire the information on the lens unit in the startup before the image projection starts. The setting before the image projection starts enables the user to use the projector 100 without recognizing the change of the projection optical system even when the lens unit 160 is changed. Thus, the projector 100 can acquire the information on the lens unit 160.

The information storage 162 stores the information on the lens unit 160. For example, the information storage 162 stores information on whether the projector 100 mounted with the lens unit 160 is to provide reversal processing of the projection image in each of the vertical direction and the lateral direction. The information storage 162 stores information on whether the projector 100 mounted with the lens unit 160 is to provide the shift direction reversal processing for the projection lens 161 in each of the vertical direction and the lateral direction in response to the instructed direction through the operation inputter 120. The information stored in the information storage 162 may be information on an operation that satisfies the application of the lens unit 160 to be connected and the expectation of the user. The information storage 162 may store determination information, design information etc. of the lens unit 160. When the information acquirer 132 acquires the information, the projector 100 sets the operational parameter (regarding the image orientation of the projection image and the shift direction of the lens unit) in accordance with the type of the lens unit 160.

Next, in the step S102, the controller 133 determines whether the projection image is to be reversed in each of the vertical direction and the lateral direction, based on the information on the lens unit 160 (or the information on the image orientation of the projection image) acquired in the step S101. When the controller 133 determines that the image orientation is to be changed, the flow moves to the step S103. On the other hand, when it is unnecessary to change the image orientation, the flow moves to the step S104.

In the step S103, the controller 133 reverses the image orientation of the projection image in each of the vertical direction and the lateral direction of the projection image, by changing the operational parameter on the image orientation of the projection image. The controller 133 may again perform the image reversal processing in accordance with the installation state (based on the installation state) of the projector 100, such as ceiling-hung installation and a rear projection, after the image reversal processing is performed in the step S103. Thereby, even when the projection image is reversed due to the optical design before and after the lens unit 160 is interchanged, the projection image is automatically changed to the original image orientation and the user can simplify the setting change procedure.

Next, in the step S104, the controller 133 determines whether the shift direction reversal processing is to be executed, based on the information on the lens unit 160 acquired in the step S101 (information on the shift direction of the lens unit). In other words, the controller 133 determines whether the shift direction reversal processing of the projection lens 161 is to be executed in each of the vertical direction and the lateral direction, in response to the input direction instructed by the user via the operation inputter 120. When the controller 133 determines that the shift direction of the projection lens 161 is to be changed, the flow moves to the step S105. On the other hand, the controller 133 ends this flow when determining that the shift direction of the projection lens 161 is not to be changed.

In the step S105, the controller 133 reverses the shift direction of the lens unit 160 in each of the vertical direction and the lateral direction by changing the operational parameter about the shift direction of the lens unit 160. After the controller 133 performs the shift reversal processing in the step S105, the controller 133 may again perform the shift reversal processing depending (or based) on the installation state of the projector 100, such as a ceiling-hung installation and rear projection. The lens shift mechanism (shifter) 170 shifts the lens unit 160 relative to the optical axis based on the shift direction set by the controller 133. Thereby, even when the optical design is changed by interchanging the lens unit 160, the shift direction of the projection image can satisfy the expectation of the user and realize the natural operability.

While the controller 133 in this embodiment determines whether the change is necessity in each of the image orientation of the projection image and the shift direction of the lens unit, the present is not limited to this embodiment. The controller 133 may determine whether the change is necessity in at least one of the image orientation and the shift direction.

(Variation)

This embodiment is not limited to the above embodiment, and the lens unit 160 may not be interchangeable. When the lens unit 160 includes a movable part for a mirror and a lens or in other cases, the image orientation of the projection image and the shift direction of the projection image (shift direction of the lens unit) may be changed without changing the lens unit 160. For example, when a movable mirror is connected to the tip of the lens unit 160 and the display direction of the projection image is variable, the information on the lens unit 160 is obtained and the operational parameter may be set.

The information storage 162 may not include a nonvolatile memory that stores the information on the lens unit 160. The information acquirer 132 is not limited to one that acquires the information by reading the nonvolatile memory. For example, the information acquirer 132 can acquire the information on the lens unit 160 by using a sensor, such as an encoder. Alternatively, a plurality of electric contacts may be provided between the lens unit 160 and the information acquirer 132, and the information can be acquired by short-circuiting or opening the electric contacts in accordance with the type on the lens unit 160 side and by confirming the statuses of the electric contacts at the information acquirer 132. The information acquirer 132 may acquire the information through communications with an external unit 200 via a communicator 190. When the information acquirer 132 acquires the information through communications with the external unit 200, the information acquirer 132 may communicate with it whenever the information is necessary or previously acquire the information and store the information in the memory in the information processor 130 or the lens unit 160. The information may be acquired by changing the shape of the connector of the lens unit 160 in accordance with the type of the lens unit 160, by recognizing the shape through the sensor etc., and by identifying the type of the lens unit.

In this embodiment, the information acquirer 132 acquires the information on the lens unit 160 in the step S101, but the present invention is not limited to this embodiment. For example, the information acquirer 132 may acquire only the identification information (lens ID) of the lens unit 160, and the controller 133 may determine the steps S102 and S104 based on the identification information. In this case, the information acquirer 132 (information processor 130) has a memory (storage) for storing the information on at least one of the image orientation and the shift direction for each type of the lens unit 160. The controller 133 may set at least one of the image orientation and the shift direction by selecting the information corresponding to the identification information among the information stored in the memory.

In this embodiment, the controller 133 changes the image orientation and the shift direction by setting the operational parameters in the steps S103 and S105, but may not change the operation immediately. For example, a dialog display unit may be provided as an informing unit that prompts the user to change the setting and the user may be prompted to change the setting through the dialog display (on screen display) on the projection image. Thereby, the user can recognize that it is necessary to change the setting and the user can change the setting if necessary or can ignore the notice.

The controller 133 may include a detector for detecting the installation state of the projector 100, such as a sensor (state detector) that detects a slope of the projector 100. The controller 133 may acquire the information on the installation state of the projector 100 based on the output signal from the sensor, and reverse the image and change the shift direction based on the installation state. In other words, the controller 133 sets at least one of the image orientation and the shift direction based on the changed installation state when the installation state is changed. This configuration can realize the image reversal and the shift direction setting based on the installation state in addition to the optical design of the lens unit 160, and simplify the setting of the projector 100 in a variety of scenarios.

The image processor 131 may reverse or rotate the image orientation of at least part of the projection image (such as reversing only the OSD (on screen display)) based on the image orientation set by the controller 133.

This embodiment sets the operational parameter regarding the shift direction of the lens unit 160 and changes the shift direction but may (digitally) shift the position of the image formed on the display panel based on the shift direction set by the controller 133.

This embodiment can provide an image projection apparatus that can automatically change the setting when a projection optical system is interchanged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-141436, filed on Jul. 21, 2017, which is hereby incorporated by reference herein in its entirety.

What is claimed is:

1. An image projection apparatus in which a projection lens is interchangeable, the image projection apparatus comprising:
   an acquirer configured to acquire information on the projection lens; and
   a controller configured to set, based on the information on the projection lens, at least one of an image direction of a vertical or lateral direction of a projection image and a shift direction of the projection image with respect to a shift direction of the projection lens,
   wherein as the projection lens, a first projection lens and a second projection lens that has a different optical characteristic from that of the first projection lens are attachable to the image projection apparatus, and
   wherein in a case where the second projection lens is attached to the image projection apparatus, the controller is configured to reverse at least one of the image direction of the projection image and the shift direction of the projection image with respect to a case where the first projection lens is attached to the image projection apparatus.

2. The image projection apparatus according to claim 1, wherein the information on the projection lens is information on the image direction stored in a memory in the projection lens, and
   wherein the acquirer acquires the information on the projection lens from the memory, and the controller sets the image direction based on the information on the projection lens.

3. The image projection apparatus according to claim 1, further comprising a memory configured to store the information on the image direction for each type of the projection lens,
   wherein the information on the projection lens is identification information of the projection lens,
   wherein the acquirer acquires the identification information from the projection lens, and
   wherein the controller selects information corresponding to the identification information based on the information on the image direction stored in the memory and sets the image direction.

4. The image projection apparatus according to claim 1, wherein the information on the projection lens is information on the image direction,
   wherein the acquirer includes a communicator configured to communicate with an external unit and acquires the information on the projection lens by communicating with the external unit, and
   wherein the controller sets the image direction based on the information on the projection lens.

5. The image projection apparatus according to claim 1, wherein the controller sets the image direction of the projection image based on the information of the projection lens, and
   wherein the image projection apparatus further comprises an image processor configured to reverse or rotate the image direction of at least part of the projection image based on the image direction set by the controller.

6. The image projection apparatus according to claim 1, wherein the acquirer detects a change of the information on the projection lens, and
   wherein the controller sets the image direction when the acquirer detects the change of the information on the projection lens.

7. The image projection apparatus according to claim 1, further comprising:
   a display unit; and
   an operation unit configured to input an operation of a user,
   wherein the controller instructs the display unit to prompt the user to change a setting of the image direction, and
   wherein the controller sets the image direction based on a changed setting when the user changes the setting via the operation unit.

8. The image projection apparatus according to claim 1, further comprising a state detector configured to detect an installation state of the image projection unit apparatus,
wherein the controller sets the image direction based on a changed installation state when the installation state is changed.

9. The image projection apparatus according to claim 1, further comprising a movable mirror,
wherein the controller sets the image direction of the projection image based on a state of the movable mirror.

10. The image projection apparatus according to claim 1, wherein the information on the projected lens is information on the shift direction stored in a memory in the projection lens, and
wherein the acquirer acquires the information on the projection lens from the memory, and the controller sets the shift direction based on the information on the projection lens.

11. The image projection apparatus according to claim 1, further comprising a memory configured to store the information on the shift direction for each type of the projection lens,
wherein the information on the projection lens is identification information of the projection lens,
wherein the acquirer acquires the identification information from the projection lens, and
wherein the controller selects information corresponding to the identification information based on the information on the shift direction stored in the memory and sets the shift direction.

12. The image projection apparatus according to claim 1, wherein the information on the projection lens is information on the shift direction,
wherein the acquirer includes a communicator configured to communicate with an external unit and acquires the information on the projection lens by communicating with the external unit, and
wherein the controller sets the shift direction based on the information on the projection lens.

13. The image projection apparatus according to claim 1, wherein the acquirer detects a change of the information on the projection lens, and
wherein the controller sets the shift direction when the acquirer detects the change of the information on the projection lens.

14. The image projection apparatus according to claim 1, further comprising:
a display unit; and
an operation unit configured to input an operation of a user,
wherein the controller instructs the display unit to prompt the user to change a setting of the shift direction, and
wherein the controller sets the shift direction based on a changed setting when the user changes the setting via the operation unit.

15. The image projection apparatus according to claim 1, further comprising a state detector configured to detect an installation state of the image projection apparatus,
wherein the controller sets the shift direction based on a changed installation state when the installation state is changed.

16. The image projection apparatus according to claim 1, further comprising a movable mirror,
wherein the controller sets the shift direction of the projection image based on a state of the movable mirror.

17. The image projection apparatus according to claim 1, further comprising a shifter configured to shift the projection lens relative to an optical axis based on the shift direction set by the controller.

* * * * *